United States Patent [19]
Brandt

[11] 3,800,312
[45] Mar. 26, 1974

[54] NON-FOLDING TRIPOD ADAPTER
[75] Inventor: Edison R. Brandt, Boca Raton, Fla.
[73] Assignee: Polaroid Corporation, Cambridge, Mass.
[22] Filed: Apr. 24, 1972
[21] Appl. No.: 246,808

[52] U.S. Cl. ............................ 354/293, 352/243
[51] Int. Cl. ....................................... G03b 17/56
[58] Field of Search.................... 95/86; 352/243

[56] References Cited
UNITED STATES PATENTS

| | | | |
|---|---|---|---|
| 2,922,609 | 1/1960 | Collier | 95/86 X |
| 2,567,068 | 9/1951 | Halmer | 95/86 X |
| 2,756,956 | 7/1956 | Anderson | 95/86 X |
| 2,826,974 | 3/1958 | Huber | 95/86 X |
| 3,437,029 | 4/1969 | Rydstedt | 95/86 |
| 3,452,663 | 7/1969 | Machtig | 95/86 |
| 3,291,179 | 12/1966 | Lang | 95/86 X |

*Primary Examiner*—Joseph F. Peters, Jr.
*Assistant Examiner*—E. M. Bero
*Attorney, Agent, or Firm*—Robert F. Peck

[57] ABSTRACT

A non-folding adapter for use with a photographic camera having an optical axis in a nonparallel orientation with respect to a supporting base of the camera. The adapter permits a realignment of the camera's optical axis to a horizontal position such that it may be conveniently coupled with a conventional tripod or positioned on a flat surface.

11 Claims, 4 Drawing Figures

NON-FOLDING TRIPOD ADAPTER

BACKGROUND OF THE INVENTION

A new variety of photographic cameras has been developed by the assignee of this application which, in part, are characterized in having an optical axis oriented at an acute angle to the base of the camera body. Exemplary of this variety of camera are those shown in U.S. Pat. Nos. 3,589,253; 3,641,889; and 3,618,493. As shown in the referenced patents, the optical axis of the camera lens is in a nonparallel orientation with respect to the supporting base of the camera. Accordingly, if the supporting base of the camera is employed to support the camera on a typical tripod mount, the camera's optical axis will be directed not toward the horizon but below it. Moreover, the camera, as configured, may not be easily placed on any convenient flat surface, e.g., a table, for time exposure pictures.

One way of achieving the same results is to provide for a bed foot arrangement on the camera bottom. While permitting an operative placement of the camera on a table, a bed foot arrangement does not allow the camera to be mounted on a standard tripod. Therefore, this type of arrangement does not solve the problem.

SUMMARY

In order to provide for these and other conveniences, a tripod adapter has been designed which permits the mounting of the camera to a typical tripod. When properly mounted upon the camera, the adapter permits the horizontal mounting of the camera on the tripod. Additionally, the adapter may be used to position the camera's optical axis parallel to the horizon when the latter is placed on any horizontal surface should a tripod be unavailable or undesirable.

The tripod adapter has the advantage of being easily installed and removed without recourse to sophisticated mechanical gadgetry. Additionally, as shown in certain embodiments of the present invention, the adapter may have a hollow center or chamber for the storage of accessories which are used in conjunction with a tripod, e.g, a cable release and self-timer.

It is therefore a general object of this invention to provide an adapter for a photographic camera having an optical axis which is not parallel to the supporting base of the camera.

It is another object and feature of the present invention to provide an inexpensive and uncomplicated tripod adapter for use in conjunction with a photographic camera.

A further object and feature of the present invention is to provide a tripod adapter for use in conjunction with a photographic camera, the tripod adapter including a first surface for coupling to and supporting the base of the camera; a second surface connected to the first surface, the second surface and the first surface being angularly separated an amount equal to the angular separation between the supporting base of the camera and the optical axis of the camera; and means for attaching the tripod adapter to the camera.

Further objects and advantages of the invention will in part be obvious and will in part become apparent as the following description proceeds. The features of novelty which characterize the invention will be pointed out with particularity in the claims annexed to and forming part of this specification.

DESCRIPTION OF THE PREFERRED EMBODIMENT

Figure 1:
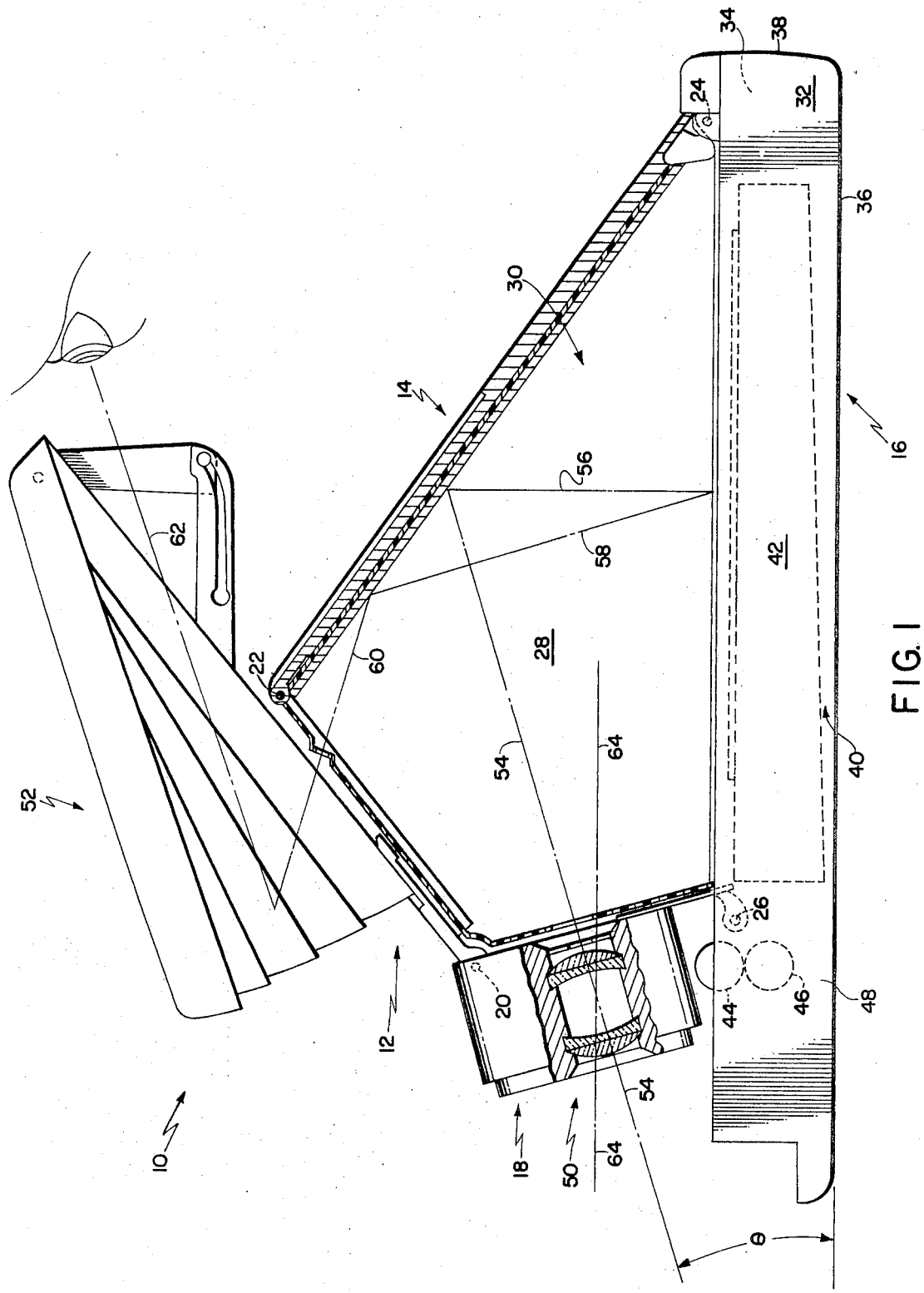
FIG. 1 is a lateral view of a photographic camera with which the present invention is employed.

Reference is now made to FIG. 1 wherein there is shown a foldable, single lens reflex camera 10 of the self-developing type in its extended or operative position. Camera 10 includes first, second, third and fourth housing sections 12, 14, 16 and 18, respectively, pivotally coupled to each other at pivots 20, 22, 24 and 26 for relative movement between a folded configuration (not shown) and the extended position as shown in FIG. 1. Housing sections 12, 14, 16 and 18 cooperate with a flexible bellows 28, secured thereto to form a six-sided exposure chamber 30. Third housing section 16 includes a pair of laterally spaced side walls 32 and 34 interconnected by a bottom wall 36 and an end wall 38 to define a U-shaped chamber 40 for receiving a film assemblage 42 shown in dashed lines therein. Extending forwardly of chamber 40 are a pair of rollers 44 and 46. Rollers 44 and 46 are mounted upon a roller support housing 48. Roller housing 48 is pivotally coupled to third housing section 16 and is adapted to be pivoted in a counterclockwise manner to move rollers 44 and 46 to a position wherein a film container 42 may be inserted into or withdrawn from chamber 40. Finally, fourth housing section 18 is pivotally coupled near its end to housing sections 12 and 16 and is provided with means for mounting a lens and a shutter assembly 50 and a shutter release button (not shown).

A viewing device 52 is mounted on first housing section 12 for movement between an operative position, as shown in FIG. 1, and an inoperative position (not shown). For a fuller understanding of the features and operation of viewing device 52, reference should be made to a copending application for U.S. Pat. entitled "Photographic Apparatus" by Richard J. Fraser and John E. McGrath, Jr., Ser. No. 203,735, filed Dec. 1, 1971 and assigned in common herewith.

Lens and shutter assembled 50 are so oriented to define an optical axis 54 which is perpendicular to fourth housing section 18. Light passing along optical axis is reflectively redirected a series of times, by a plurality of mirrored surfaces (not shown), within camera 10, as may be evidenced by its light path shown by lines 56, 58, 60 and 62. The optical axis 54 of lens and shutter assembly 50 is oriented at an acute angle $\theta$ with respect to third housing section 16 which acts as a support base for camera 10. In one preferred embodiment of camera 10, this angle $\theta$ is equal to approximately 15 degrees. Thus, lens assembly 50 is directed at an angle of 15 degrees below the horizon, as shown by line 64, and therefore, must be redirected for the majority of photographs which the camera user might take. It should become apparent that using third housing section 16 as a base alone would be inconvenient for time exposure or self-timed photographs.

Figure 2:
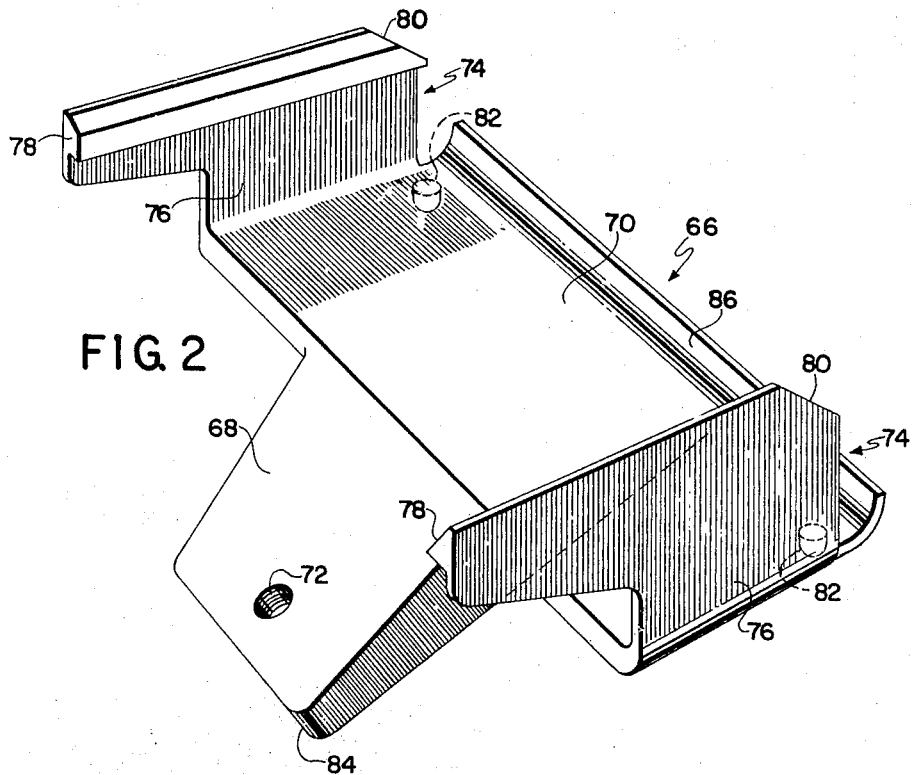
FIG. 2 is a perspective view of the tripod adapter of the present invention.

Looking to FIG. 2, there is shown a preferred embodiment of the present invention. A non-folding tripod adapter, shown at 66, is a T-shaped member. Adapter 66 is formed having a first portion 68 and a second elongated U-shaped portion 70 integrally formed therewith. First portion 68 is oriented at an angle with the plane defined by second portion 70 for reasons which will become apparent below. A standard sized threaded bore 72 is provided within first portion 68 for accepting the mounting screw of a conventional tripod. Second portion 70 is configured having a detent structure 74 at each of its ends. Detent structures 74 have a vertical wall portion 76 and a hooked portion 78. Hooked portions 78 function to hold camera 10 to adapter 66 through a top portion of side walls 32 and 34. Detent structures 74 are separated a distance which is equal to the width of camera 10. Accordingly, camera 10 can be easily accommodated between detent structures 74 for mounting purposes. Also provided on adapter 66, at hooked portions 78, is a sloped cutaway segment 80, the purpose of which will become apparent below. Located on the bottom of second portion 70 are two feet 82 which extend below the plane of the bottom of second portion 70. Feet 82 and a lower line portion 84 of first portion 68 establish a solid support for tripod adapter 66 and camera 10. Finally, located at the rearward edge of adapter 66 is a short vertical wall 86 having a gradual slope between the substantially flat portion of portion 70 and the vertical wall 86. This gradual slope generally conforms with the slope of rear wall 38 of camera 10. Adapter 66 may be formed of molded plastic or may be machined from a metal such as aluminum.

Figure 3:
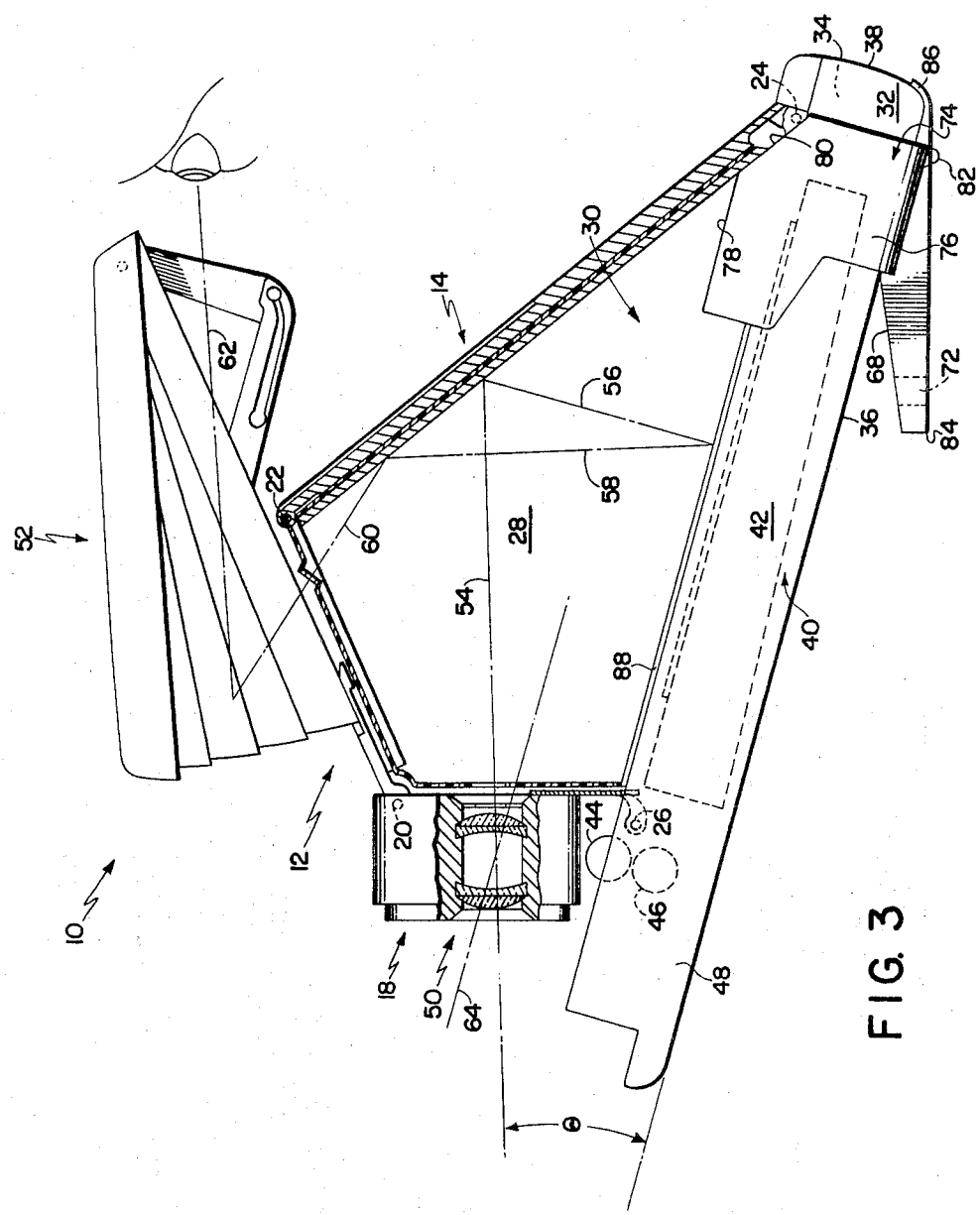
FIG. 3 is a lateral view of the photographic camera of FIG. 1 mounted upon the tripod adapter according to the present invention.

The manner in which adapter 66 is attached to camera 10 is shown in FIG. 3. The adapter 66 is positioned at the rearward portion of the camera proximate end wall 38. The erected camera 10 is inserted, rear end first, into adapter 66 between detent structures 74 until the rear wall 38 of camera 10 contacts the vertical wall 86 of adapter 66. The sloped portion of camera 10 just below rear wall 38 now coincides with the sloped portion of the adapter. Third housing section 16 of camera 10 is adjacent the flat portion of second portion 70 as is shown in FIG. 3. When camera 10 is correctly seated upon adapter 66, the hook portions 78 fall over the top edge 88 of laterally spaced side walls 32 and 34. It is this engagement which holds adapter 66 to camera 10. Slope portion 80 of adapter 66 now fits along the inner portion of second housing section 14, thereby preventing adapter 66 from slipping backward along camera 10 toward rear wall 38. When mounted, adapter 66 permits the pivoting of roller housing 48 thereby allowing the camera user to load camera 10 with film even when the adapter is mounted to camera 10 and both are mounted on a tripod. It should also be noted that adapter 66 may be attached to camera 10 only when the latter is in an erected state. Additionally, the adapter must be removed from the camera before camera 10 is folded. If this is not done, second housing section 14 will contact the top of hooked portion 78 and damage to camera 10 may occur if appreciable force is applied in an attempt to fold the camera.

When camera 10 is properly mounted upon adapter 66, the threaded bore 72 is positioned directly below the center of gravity of the erected camera 10. As a result, camera 10 is solidly supported and may be mounted upon a conventional tripod or placed upon a flat horizontal surface such as a table. When the camera 10 is placed on a table it is supported by feet 82 and the lower line portion 84 of first portion 68. It should be noted that the plane of second portion 70 of adapter 66 is oriented at an angle of 15 degrees with respect to the plane defined by feet 82 and lower line portion 84. It should be obvious that this supporting arrangement will give a more stable support base for camera 10 than would a flat support base should such stability be of primary importance.

With the arrangement shown, the optical axis 54 of camera 10 is reoriented 15 degrees upward and is now parallel with the horizon. It is in this reoriented position that the majority of self-timed and cable-released photographs are taken. This is true both when the adapter 66 is attached to a conventional tripod or merely placed upon a flat horizontal surface.

Figure 4:
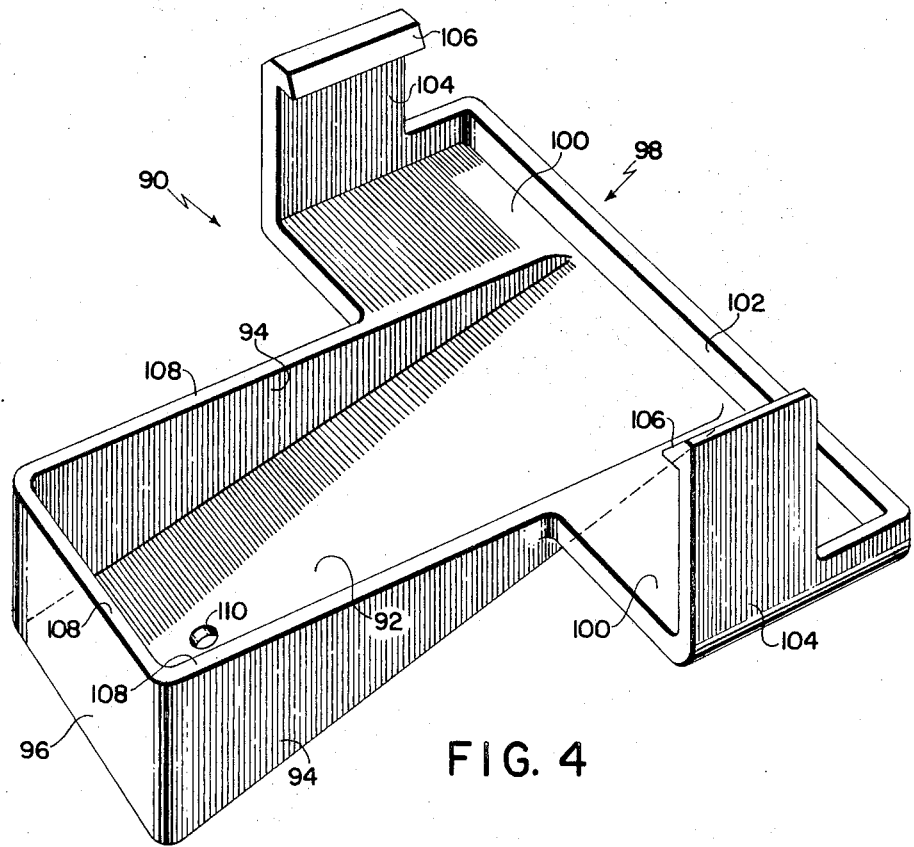
FIG. 4 is a perspective view of a second embodiment of the tripod adapter according to the present invention.

An alternative embodiment of a tripod adapter for camera 10 is shown in FIG. 4. The adapter 90 is formed having an inclined bottom portion 92, two vertical side walls 94, a vertical front wall 96 and a rear portion shown generally at 98. Rear portion 98 is configured similar to the second portion 70 of adapter 66. A flat inner surface 100 is located at either end of rear portion 98 for supporting the camera 10. The plane of inner surfaces 100 is extended as the top edge 108 of vertical walls 94 and 96. Located at the rearward edge of portion 98 is a short vertical wall 102 which limits forward movement of adapter 90 when it is attached to camera 10. Two vertical detent structures 104 are formed at the outer lateral edges of rear portion 98 and function in the same manner as do structures 76 on adapter 66. Two hook portions 106 are located at the top of structures 104 and function to hold adapter 90 to camera 10 through the top 88 of side walls 32 and 34 of camera 10. Also provided within bottom portion 92 is a standard threaded bore 100 for attaching adapter 90 to a conventional tripod.

As may be evidenced from FIG. 3, inclined bottom portion 92 is set at an angle with respect to the plane established by surface 100 and edges 108. In a preferred embodiment, this angle is approximately 15°. Therefore, when adapter 90 is attached to camera 10 the latter is elevated at its front by 15° such that its optical axis 54 is now horizontal. Similarly, if camera 10 and adapter 90 are placed on a flat horizontal surface, bottom portion 92 acts as a support base and reorients the optical axis 54 upwardly by a similar 15°.

In the embodiment just discussed, the interior portion of adapter 90 has been left open. This portion is defined by vertical walls 94 and 96 and bottom portion 92. Configured as such, the interior portion of adapter 90 is a convenient location for the storage of accessories, such as "self-timer and/or cable release," which are used in conjunction with tripods. Although they are not shown, clamps and the like may be molded into this interior portion to conveniently retain such accessories. Alternatively, the adapter 90 may be formed as a solid member (with no hollow interior portion) thereby doing away with this storage space.

It should become obvious to those skilled in the art that there are a variety of ways in which to form a tripod adapter for a camera of the type herein disclosed. While only a few have been discussed, they are meant to be illustrative and not limiting Applicant has provided a tripod adapter which functions to reorient the optical axis of a camera from a normal non-horizontal position to a horizontal position. The adapters are of a simple and uncomplicated design with an emphasis on easy mounting and easy removal of the adapter from the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A non-folding adapter for a photographic camera having an objective lens and a plurality of housing elements, the optical axis of said lens being oriented at an acute angle with respect to a supporting base element of said housing elements, said adapter comprising:

a first planar section engageable with said supporting base element for receiving and supporting said camera;

a second section angularly disposed with respect to said first section, the planes of said first section and said second section being oriented at an angle substantially equal to said acute angle between said optical axis and said base element;

flexible detent means for releasably attaching said adapter to said camera, said flexible detent means being frictionally engageable with a portion of said base element, and said detent means including forward limiting means, formed as a portion thereof for preventing said photographic camera from moving longitudinally forwardly on said adapter when said adapter is attached to said camera, said limiting means being configured to abuttably engage one of said housing elements; and means extending from said first planar section for limiting rearward longitudinal movement of said camera on said adapter when said adapter is attached to said camera.

2. The adapter according to claim 1 in which said detent means extend from said first section.

3. The adapter according to claim 1 in which said second section is formed having a bore therein through which said adapter may be coupled to a tripod, said bore being located substantially below the center of gravity of said camera when said camera is mounted to said adapter.

4. The adapter according to claim 1 in which said means for limiting the rearward longitudinal movement of said camera is formed as a vertical wall member at a rearward edge of said first section, said vertical wall member being engageable with at least a portion of said base element of said camera.

5. The adapter according to claim 1 in which a portion of the area between the plane of said first section and the plane of said second section is hollowed out for permitting the storage of photographic camera accessories.

6. The adapter according to claim 1 in which the area between the planes of said first section and of said second section is solid.

7. The adapter according to claim 1 in which said first section has an inside width substantially equal to the width of said camera.

8. The adapter according to claim 7 in which said second section has a width substantially less than the width of said first section.

9. The adapter according to claim 1 in which foot means are provided on the bottom of said first planar section, said foot means and a linear bottom portion of said second section establishing a plane for providing a supporting base for said adapter, said plane established by said foot means and said linear bottom portion of said second section and said plane of said first section being oriented at an angle substantially equal to said acute angle between said optical axis and said base.

10. The non-folding adapter according to claim 1 in which said forward limiting means abuttably engages a housing element adjacent to said base element when said adapter is attached to said camera.

11. The non-folding adapter according to claim 10 in which said forward limiting means is formed as a selectively sloped portion of said flexible detent means, said sloped portion of the flexible detent means being configured to fit between said housing element adjacent said base element and said base element.

* * * * *